Patented July 3, 1934

1,965,283

UNITED STATES PATENT OFFICE 1,965,283

CONDENSATION PRODUCT OF BENZOIN AND NAPHTHOL SULPHONIC ACID

Friedrich Felix and Jakob Scheidegger, Basel, Switzerland, assignors to the firm of Society of Chemical Industry in Basle, Basel, Switzerland No Drawing. Application January 13, 1933, Serial No. 651,655. In Switzerland January 16, 1932

3 Claims. (Cl. 260—131)

According to this invention the sulfonated products which are obtainable by condensing aromatic hydroxy-compounds with benzoin constitute remarkably valuable auxiliary agents in baths used for treating animal and vegetable materials. These auxiliary agents are characterized particularly by their property of diminishing more or less strongly, or of removing, the affinity of dyestuffs for fibres, particularly animal fibres. This property makes these products useful for attaining various objects in the textile and allied industries. For example, they may be applied for attaining tone in tone-dyeing and for producing reserve effects in the various requirements of the dyeing of mixed fabrics. Furthermore, they may be used in particular in acid dye-baths for producing level dyeings, especially in producing combination dyeings where level dyeings are only obtained with difficulty. They also facilitate the dyeing through of dense materials and are therefore pre-eminently suitable in cases where thick fabrics have to be dyed. Their application in milling, particularly as additions to acid milling liquids, prevents in a quite important degree the bleeding of dyestuffs on to white wool which is being milled together with the dyed material.

For the above purpose there are suitable, quite generally, the sulphonic acids or their salts of the condensation products from benzoin and phenol or its substitution products, such as cresols, chlorophenols, salicylic acid; also the products from naphthols, hydroxyanthracenes, hydroxyanthaquinones, hydroxyphenanthrenes, hydroxydiphenylenes or the like. The sulphonic acids are made by combining the aromatic hydroxy-compound with benzoin in the presence of a condensing agent or solvent, such as sulphuric acid, fuming sulphuric acid or chlorosulphonic acid, and then introducing the sulphonic acid group or groups, if this or these were not present in the hydroxy-compound used, either during or after the condensation. According to the choice of the starting materials, the concentration of the sulphonating agent, the temperature and the duration of the reaction, the properties of the condensation products may vary within certain limits. The mode of making the products, therefore, should be considered with regard to the effects which they are to produce. For example, if a high degree of reserve effect is to be obtained, it is advantageous to make the condensation product from an aromatic hydroxy-compound containing two or more nuclei, and benzoin; while when the product is to be used for obtaining tone in tone-dyeing and level dyeings, it should be made with a view to its having a relatively small molecular weight.

The condensation products from benzoin and naphtholsulphonic acids herein referred to have not hitherto been described. They are obtained by condensing the naphtholsulphonic acid in question with benzoin in presence of a suitable condensing agent, for instance sulphuric acid, fuming sulphuric acid or chlorosulphonic acid.

The new condensation products may also be made in a single operation in which the naphtholsulphonic acid is produced, that is to say benzoin may be allowed to react with the crude sulphonation product of the naphthol ($\alpha$- or $\beta$-naphthol) being sulphonated. It has been observed that for many purposes there may be used with good results a mixture of the condensation product from benzoin and the various naphtholsulphonic acids.

The following examples illustrate the invention, the parts being by weight:—

Example 1

30 parts of the sodium salt of commercial 2-naphthol-6-sulphonic acid are dissolved in 250 parts of concentrated sulphuric acid. While constantly stirring there are added 15–20 parts of benzoin, the temperature being maintained at 20–40° C. After the stirring has been continued for about 1–2 hours, the crude condensation product is poured on ice. The resulting precipitate is filtered and washed with a sodium chloride solution. The residue is then dissolved in water, its solution neutralized with sodium carbonate and, if necessary, filtered from a small amount of impurities. The new product may now be isolated by evaporating the solution, preferably in a vacuum. It forms a light, pulverizable mass which readily dissolves in water and yields an easily foaming solution. The product represents probably a mixture of the sodium salts of the following condensation products:—

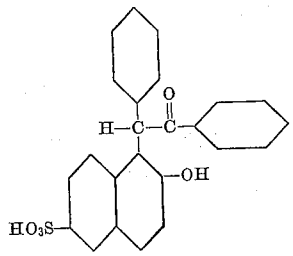

and

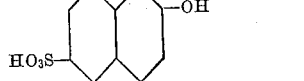

Example 2

40 parts of commercial sodium 2-naphthol-3:6-disulphonate are dissolved in 250 parts of concentrated sulphuric acid. Into the mixture there are introduced, at 20–40° C. while stirring well, 20–25 parts of benzoin. After the whole has stood for some time it is diluted with ice, filtered and the solid matter washed as free as possible from sulphuric acid by means of sodium chloride solution. The residue is dissolved in water, neutralized with sodium carbonate and if necessary filtered from impurities. The product may be salted out from the clear solution by means of sodium chloride or another salt of similar action. The product is then dried and powdered.

The process of working up the sulphonation product may be varied by diluting with much water the acid condensation mass, neutralizing it with calcium carbonate and, after filtering from calcium sulphate, converting the calcium salt into the sodium salt by means of sodium carbonate. The product represents probably a mixture of the sodium salts of the following condensation products:—

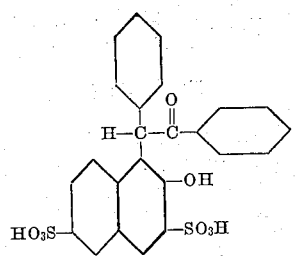

and

Example 3

14.4 parts of α-naphthol are dissolved in 40 parts of concentrated sulfuric acid and there are gradually introduced, at 20–40° C., 15–20 parts of benzoin. 20 parts of sulfuric acid of 100 per cent. strength are then added and the whole is stirred for some hours at room temperature. The further working up follows the method described in Example 1 or Example 2. The product represents probably a mixture of the sodium salts of the sulphonic acids of the following three products:—

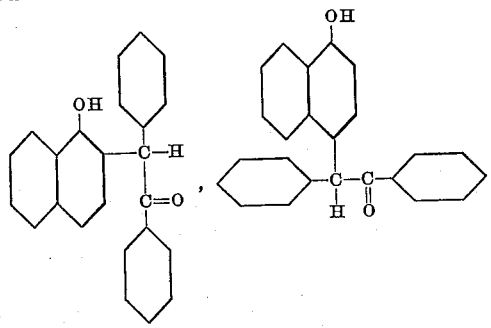

and

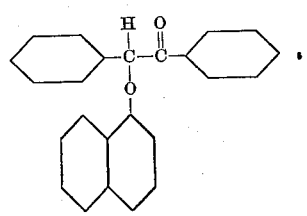

A similar procedure may be followed in making condensation products from β-naphthol and also from other hydroxy-compounds or their sulphonic acids. Instead of sulphuric acid there may be used chlorosulphonic acid or fuming sulphuric acid or a mixture of these.

These products may be used with advantage in all those cases in which the improvement of animal fibres is concerned; they may therefore be added to the various treating baths. More particularly they are of valuable service in the production of white effects on half-wool, half-silk and like goods; also they may be usefully applied in obtaining multi-color effects on the said goods. This may be illustrated by the following examples:—

Example 4

100 parts of half-wool are dyed at 60° C. for ¾ hour with 2 parts of Chlorantine red 8BN (Colour Index No. 436) with addition of 30 parts of crystallized sodium sulphate and 1.5 parts of the neutral product obtainable by condensing 30 parts of the sodium salt of 2-naphthol-6-sulphonic acid with 15–20 parts of benzoin in concentrated sulphuric acid at about 40° C. The material is then washed, rinsed and dried. The wool is scarcely dyed while the cotton is dyed a strong red. Without use of the auxiliary agent named the wool is strongly dyed.

A like good result is attained when, instead of the condensation product from 2-naphthol-6-sulphonic acid a neutral product is used which may be obtained by condensing 40 parts of the sodium salt of 2-naphthol-3:6-disulphonic acid with 20–25 parts of benzoin in 250 parts of concentrated sulphuric acid. One may also use the product which is obtainable by condensing a naphthol sulphonation mixture with benzoin in a condensing agent.

Example 5

Half-wool piece goods are preliminarily dyed with 2 per cent. of their weight of Orange II (Colour Index No. 151), 4 per cent. of formic acid and 10 per cent. of crystallized sodium sulphate at the boil, then rinsed and after-dyed for ¾ hour with 1 per cent. of greenish Direct Sky blue (Colour Index No. 518), 2 per cent. of the neutral condensation product from 2-naphthol-3:6-disulphonic acid and benzoin and 30 per cent. of crystallized sodium sulphate. After washing and drying, the half-wool has a clear two-color effect which could not have been attained without the addition of the auxiliary agent.

Example 6

A piece of heavy cloth is dyed by introducing it, at 50° C., into a dye-bath prepared from the following ingredients—

0.5 per cent. of Benzyl Fast Bordeaux B (Colour Index No. 85).

4 per cent. of sulphuric acid of 66° Bé.

10 per cent. of crystallized sodium sulphate.

2 per cent. of the neutral condensation product from 1-hydroxybenzene-3-sulphonic acid and benzoin.

The material is dyed at the boil in this bath for 1 hour, then rinsed, centrifuged and dried. There is obtained a remarkably level dyeing, and even in the case of quite heavy material the dyestuff will have penetrated uniformly into the interior of the cloth.

A like result is obtained with the use of condensation products from polynuclear aromatic compounds with benzoin, and in this case a pronounced effect can be obtained even with essentially smaller proportions of auxiliary agent.

Example 7

Wool is dyed in the usual manner in an acid bath with 1 per cent. of its weight of the sodium monosulphonate of the oxidized condensation product from 4:4'-diethylaminodiphenylcarbinol and N-benzyl-α-naphthylamine, and then subjected to the following acid milling: The blue-dyed wool mixed with 50 per cent. of white is milled for 4 hours in a liquor containing per litre 1 gram of sulphuric acid and 2 per cent. of condensation product of naphtholsulphonic acid and benzoin, made as described in Example 4, the ratio of goods to the liquor being 1:50. The white wool milled together with the dyed wool does not become dyed or acquires only a trace of dye, whereas without the addition of the auxiliary agent strong bleeding of the dyestuff occurs. Similar results are obtained with dyestuffs of other groups, for example azo-dyestuffs, such as Orange II (compare Colour Index 151) or with chromium compounds of ortho-hydroxyazo-dyestuffs, for instance the chromium compound of the dyestuff from 5-nitro-ortho-aminophenol and 2-naphthylamine-6-sulphonic acid.

Example 8

100 parts of a mixed fabric consisting of wool and acetate silk are dyed for 1 hour at 40–80° C. in 3000 parts of a dye-bath which contains 0.6 part of a dyestuff preparation consisting of 40 per cent. of 1:4-dimethyldiaminoanthraquinone 20 per cent. of a neutral condensation product from benzoin and 2-naphthol-3:6-disulphonic acid 40 per cent. of dry sulphite cellulose liquor.

The bath also contains 2 parts of Alizarine Sapphire blue G (Schultz, 7th Edition, No. 1187) and 4 grams per litre of a sulphonated oil. Towards the end of the operation there are added with advantage to the dye-bath 2 parts of formic acid. The goods are then rinsed, centrifuged and dried. The mixed fabric is uniformly dyed and the dyeing is fast to rubbing, which without the said auxiliary agent is not the case in the desired degree.

What we claim is:—

1. The condensation products from benzoin and naphtholsulphonic acids, which products are light powders, whose alkali salts are readily soluble in water and have pronounced affinity for animal fibres since they protect the fibres from quickly absorbing a dyestuff.

2. The condensation products from benzoin and β-naphtholsulphonic acids, which products are light powders whose alkali salts are readily soluble in water, do not couple with diazo-compounds and have pronounced affinity for animal fibres in that they protect the fibres from rapidly absorbing a dyestuff.

3. The condensation product from benzoin and 2-hydroxynaphthalene-3:6-disulphonic acid which product is a light powder, whose alkali salts are readily soluble in water, do not couple with diazo-compounds and have a pronounced affinity for animal fibres since they protect the fibres from quickly absorbing a dyestuff.

FRIEDRICH FELIX.
JAKOB SCHEIDEGGER.